(12) United States Patent
Hahn et al.

(10) Patent No.: US 8,191,798 B2
(45) Date of Patent: Jun. 5, 2012

(54) AGRICULTURAL FIELD SPRAYER AND PROCESS FOR ITS OPERATION

(75) Inventors: Klaus Hahn, Mannheim (DE); Heiko Eberbach, Epfenbach (DE); Ralf Hirschpek, Mannheim (DE); Willy Peeters, CD Overloon (NL); Robert E. Lorentzen, Bondurant, IA (US); Kent Alvin Klemme, Ankeny, IA (US)

(73) Assignee: Deere & Company, Moline, IL (US)

( * ) Notice: Subject to any disclaimer, the term of this patent is extended or adjusted under 35 U.S.C. 154(b) by 458 days.

(21) Appl. No.: 12/538,500

(22) Filed: Aug. 10, 2009

(65) Prior Publication Data

US 2010/0200668 A1    Aug. 12, 2010

(30) Foreign Application Priority Data

Aug. 11, 2008 (DE) .......................... 10 2008 041 159

(51) Int. Cl.
*B05B 9/06* (2006.01)
*B05B 1/20* (2006.01)
*B05B 9/00* (2006.01)

(52) U.S. Cl. .......... 239/157; 239/11; 239/124; 239/127; 239/156; 239/159

(58) Field of Classification Search ................ 239/1, 11, 239/124, 127, 155–157, 159, 172
See application file for complete search history.

(56) References Cited

U.S. PATENT DOCUMENTS

| | | | | |
|---|---|---|---|---|
| 3,782,634 A | * | 1/1974 | Herman | 239/156 |
| 4,530,463 A | | 7/1985 | Hiniker et al. | |
| 4,553,702 A | | 11/1985 | Coffee et al. | |
| 4,721,245 A | | 1/1988 | van Zweeden | |
| 5,004,155 A | | 4/1991 | Dashevsky | |
| 5,407,134 A | | 4/1995 | Thompson et al. | |
| 5,520,333 A | * | 5/1996 | Tofte | 239/10 |
| 5,911,362 A | * | 6/1999 | Wood et al. | 239/1 |
| 6,786,425 B2 | | 9/2004 | Rawlings | |
| 2002/0071916 A1 | | 6/2002 | Rawlings | |
| 2007/0138315 A1 | * | 6/2007 | Earle et al. | 239/146 |

FOREIGN PATENT DOCUMENTS

EP    0569252    11/1993

OTHER PUBLICATIONS

European Search Report ceived Apr. 6, 2011 (7 pages).

* cited by examiner

*Primary Examiner* — Darren W Gorman

(57) ABSTRACT

An agricultural field sprayer (10) includes an electrically driven pump (50) locatable directly under sprayer fluid tank for conveying the fluid from the tank to a supply line. A return line (54) connects the pump (50) to the tank (22), and a sprayer line (32) connecting the pump (50) to an application assembly (20). The return line (54) and the sprayer line (32) include electrically operated control valves (68, 64), and an electronic control system (56) operates the motor (46) and the control valves (64, 68) as a function of different variables including field sprayer speed and sprayer fluid characteristics. The valve and motor controls and an additional valve-controlled return line facilitate numerous operational modes including tank fill, rinse, recirculation, spray, partial width spray, and stop modes.

18 Claims, 2 Drawing Sheets

AGRICULTURAL FIELD SPRAYER AND PROCESS FOR ITS OPERATION

FIELD OF THE INVENTION

The invention concerns an agricultural field sprayer with a tank to store sprayer fluid, sprayer gear for the application of sprayer fluid, a pump for the conveying of sprayer fluid, a supply line connecting the tank with the sprayer, a return line connecting the pump with the tank and a sprayer line connecting the pump with the sprayer gear. Furthermore the invention concerns a process for the operation of an agricultural field sprayer.

BACKGROUND OF THE INVENTION

Agricultural field sprayers are known in which the pumps used to convey sprayer fluid are driven hydraulically or mechanically. In the case of towed sprayers a tractor power take-off shaft or hydraulic motors driven from a hydraulic source on the tractor provide power. Pumps driven in such a way are usually operated at a constant pump rotational speed so that constant amounts of fluid are conveyed. The amounts conveyed or the flow rates are varied by means of bypass valves to adjust the flow rate required for a particular application. The variation can be a function of the area of the sprayer gear or a partial area adjustment, or a selected operating velocity or a desired amount of sprayer fluid. In addition to the actual application of the sprayer fluid, the flow rate generated by the pump or the volume flow generated by the pump also functions to circulate the contents of the tank and assure a uniform concentration of the sprayer fluid in the constant rate of flow. Depending on the type and composition of the sprayer material, an excessively large flow rate could be applied that could lead to foaming of the sprayer fluid, particularly if only a residual amount of sprayer fluid is contained in the tank. Furthermore it is usual practice and may also be required by law to perform a cleaning of the sprayer on the field in order to remove residual amounts of sprayer fluid in the tank and in the fluid line system. The position of the pump plays a major role in the rate of cleaning that can be attained, and positioning of the pump close to the tank is advantageous. Due to limitations of the configuration resulting from conventional pumps being driven by power takeoff shafts, rates may be insufficient for proper of cleaning of the system.

SUMMARY OF THE INVENTION

The problem underlying the invention is providing an agricultural field sprayer of the above-mentioned kind which overcomes the aforementioned problems.

An agricultural field sprayer is described that includes a tank that accepts sprayer fluid, a sprayer gear to apply sprayer fluid, a pump for the conveying of sprayer fluid, a supply line connecting the tank with the pump, a return line connecting the pump to the tank and a sprayer line connecting the pump with the sprayer gear. In order to improve operating conditions that depend upon vehicle speed, the invention proposes that an electric motor be provided to drive the pump, that the return line and the sprayer line each be provided with an electrically controlled control valve and that an electronic control system be provided to control the motor and the control valves as a function of the vehicle speed of the field sprayer. A corresponding process for an agricultural field sprayer is proposed.

According to the invention an agricultural field sprayer of the kind cited initially is equipped with an electric motor to drive the pump. The return line and the sprayer line each include at least one electrically operated control valve. An electronic control system connected to the motor and the control valve structure controls the motor and valve structure as a function of the vehicle speed of the field sprayer. It is also possible to control the motor as a function of the desired application amount, partial width spraying area, and/or desired mixture application rate. Since an electric motor is used to drive the pump in combination with the aforementioned control valve structure in the return and sprayer lines, the required flow rate can be optimized in terms of the various adjustable operating conditions including vehicle speed. Precise fluid control depending on the various function or operating mode of the vehicle, including a stopped condition of the vehicle, can be achieved without conventional bypass valves and the disadvantages of conventional bypass valve systems. Vehicle speed sensing for purposes of providing a speed signal to a controller can be provided by a speed sensor or by rotational speed sensors on the towing vehicle or on the field sprayer. Miscellaneous vehicle data or vehicle signals such as a vehicle speed signal or an acceleration signal can then be recalled in the usual and known manner for purposes of control. Since an operation of the field sprayer can be performed independently of the power take off shaft of the tractor further advantages can be attained. Since the limitations of a power take off shaft are removed, small turning radii can be attained. Furthermore, the tractor and the field sprayer no longer need to be carefully matched to each other, and costly maintenance procedures associated with an articulated drive shaft driven by a power take off shaft are eliminated. Coupling the field sprayer to the tractor can be performed much more easily and comfortably since simpler attachment couplings are used. By driving the pump with an electric motor independently of any mechanical coupling or towing vehicle engine speed, excessive pump speeds and the disadvantages of a power take off drive are avoided. The sprayer tank filling processes can be performed at a low idle speed of the towing vehicle since the pump power requirements need not depend on the power take off shaft output. Higher efficiencies can be expected since continuously variable drive rotational speeds are possible.

Further, advantages are attained in connection with the recirculation of the tank contents. Foaming of the sprayer fluid in the tank can be avoided or reduced by purposeful and more exact correlation of the flow rate for the different operating conditions. Furthermore the total power requirement can be reduced by an optimized conformance of the flow rate to the immediate power consumption, so that the overall fuel consumption of the towing vehicle is also reduced. The pump may be connected at its outlet side by a Y-connection with the sprayer line and the return line, where the control valves are positioned behind of upstream of the Y-connection.

The sprayer line may include a pressure sensor or a flow sensor permitting the motor and the control valve to be controlled as a function of a corresponding pressure signal or flow signal. The pressure or flow sensor can be located in the vicinity of the control valve and may be slightly downstream of the control valve. The sensor may also be located, for example, in the vicinity of the sprayer gear.

In one embodiment, the return line is provided with a pressure and/or flow sensor so that the motor and the control valves also can be controlled as a function of a corresponding pressure and/or flow signal where the arrangement of the pressure and flow sensor also takes place downstream of the control valve. The pressure and/or flow sensors deliver corresponding control signals to the electronic control system. The control system may include a control arrangement responsive to the sensor signal, and is provided with a memory system that can be controlled on the basis of the algorithm and control data. The control system utilizes the control signals to provide selective operation of the control valves. In order to maximize the precision of the entire system, flow sensors typically may be applied. Such sensors however often are inferior to the simple pressure sensors in terms of robustness and cost. A flow sensor may be used in the sprayer line and a more robust pressure sensor may be placed in the return line to provide an advantageous compromise regarding precision, robustness and cost.

The sprayer gear may be subdivided into several sections that are selectively controlled by further control valves or partial width valves that can be selectively activated and inactivated. The motor and the control valves can be controlled as a function of the operating condition of the selected partial width spraying area or section. This control is significant since, with larger sprayer areas or with a number of sections of the sprayer gear in operation, greater flow rates are required compared to the flow rates required for smaller sprayer areas or for fewer operating partial width areas of the sprayer gear. The actuation of the individual partial areas of the sprayer gear is preferably controlled by control valves that are arranged in the sprayer gear along the sprayer lines and that subdivide the sprayer gear into several partial areas that can be individually turned on or off. By controlling the operation of the valves, the various partial areas or sections can be selectively put into operation or taken out of operation.

The sprayer line may be connected with a further return line, through which the sprayer line is connected to the tank to return sprayer fluid via the sprayer line to the tank. Flow of sprayer fluid through the additional return line may also be controlled by an additional control valve, and the motor and the other control valves can be controlled as a function of the pressure and/or the flow in the additional return line. The additional return line, through which non-applied sprayer fluid is returned to the tank, defines a recirculation system wherein the degree of recirculation can be controlled or regulated by the additional control valve. The control system can regulate the proportion of the sprayer fluid that is not applied and can simultaneously vary the pressure in the sprayer line. The unique combination of the controllable valves and electric motor provide a wide range of pressure, flow, recirculation, partial width functions, shutoff and cleaning options not heretofore attainable with at least most of the typical prior art devices.

Input devices may be provided through which various operating modes can be adjusted for the electronic control system and wherein the motor and the control valve can be controlled as a function of an adjustable operating mode. The input device may, for example, include an on-board computer or input monitor or a control desk may be used. An operator can generate various control orders or activate various operating modes by means of the input device. Corresponding control orders or operating modes are then associated with in each case different control data and control algorithms that are stored in the memory of the electronic control system or in another memory such as the on-board computer to be used as a basis by the electronic control system for the control of the motor and of the control valves.

One or more of the control valves can be configured as electrically controlled adjustable throttle valves or as proportional path valves. The configuration as an electrically controlled throttle valve or a proportional path valve permits a nearly continuous adjustment of the flow rate and pressure in the corresponding lines, either in the sprayer line or in the return lines or in any other line of the sprayer system.

Since the pump is electrically controlled, it can be positioned freely and independently of the power take off shaft and hence close to the tank or the bottom of the tank, so that advantages can be achieved in the cleaning of the system. The location of the pump in close proximity to the tank facilitates more complete cleaning so that less sprayer material remains in the sprayer system. The improved positioning of the pump helps minimize pressure losses in the sprayer system. The pump may be positioned below the bottom of the tank and close to the tank outlet. Placing the pump close to the sprayer gear minimizes the total length of line including the sprayer line, the return line for the recirculation process as well as other lines that are needed for the filling, fluid return and cleaning.

The invention also proposes a process with which the field sprayer described above can be operated. The agricultural field sprayer includes a tank that can contain sprayer fluid, sprayer gear for the application of sprayer fluid, a pump for conveying sprayer fluid, a supply line connecting the tank with the pump, a return line connecting the pump with the tank, and a sprayer line connecting the pump with the sprayer gear. The pump is driven by an electric motor. The return line and the sprayer line are each equipped with an electrically operated control valve connected to an electronic control system. The process provides that the motor and the control valve be controlled as a function of the vehicle speed of the field sprayer. The advantages resulting therefrom have already been described above.

The process also provides that when the pump has been brought into operation and upon stopping of the agricultural field sprayer, that is when the vehicle speed is equal to zero, that the control valve provided in the return line be opened and the control valve provided in the sprayer line be closed and the electric motor of the pump as well as the control valves be controlled, particularly the control valve provided in the return line, as a function of the type of sprayer material and/or a degree of filling of the tank and/or an adjustable time interval. The electronic control system processes electronic control signals that are generated, for example, by the aforementioned input devices and an operator can provide as input the type of sprayer material or even a time interval, whereupon corresponding control signals are generated in connection with the data stored from the input devices or stored in the electronic control system. The time interval that may be provided as input may, for example, be a time interval that provides an input that defines how long a recirculation process is interrupted or after which time interval the recirculation process is again actuated, after it was interrupted. For this purpose the electronic control system is preferably equipped with a timing device. Regarding the degree of filling of the tank, a further sensor may be provided that monitors the degree of filling of the tank and can generate corresponding control signals that are provided to the electronic control system as control magnitudes. A sensor of this type is well known from the state of the art. In this way pump and control valves can be operated or controlled as a function of the vehicle speed, that is also in consideration of whether the agricultural field sprayer is moving, and in consideration of other factors such as type of sprayer material, degree of filling of the tank with sprayer material and time indication or time interval indications.

The process also provides that when the agricultural field sprayer is accelerating the control valve provided in the sprayer line is opened as a function of the acceleration and the motor is operated with increasing or decreasing rotational speed in accordance with increasing or decreasing vehicle speed. Doing so makes possible opening of the control valve in the sprayer line to an increasing degree and increasing the rotational speed of the motor to increase the pump output and attain a higher flow rate in the sprayer line. When field sprayer speed is reduced, the process increasingly closes the control valve in the sprayer line with decreasing velocity of the field sprayer, and the motor rotational speed and hence the pump output is reduced in order to reduce the flow rate in the sprayer line. The process may include control of the motor upon further increasing vehicle speed, if the control valve in the sprayer line has already been completely opened, to such a degree that the flow rate can be increased corresponding to the increase of the motor rotational speed conforming to the increase in the vehicle speed to increase the pump power output.

The process provides independent control of the recirculation rate even, for example, when the control valve in the sprayer line is fully opened and the control valve provided in the return line is closed or it is opened as a function of the further increasing or decreasing motor rotational speed. The result is that when the flow rate in the sprayer line is further increased or decreased, the recirculation rate of the sprayer fluid contained in the tank is controlled independently of the change and may, for example, be held constant or even reduced or increased.

The process also provides that the sprayer gear can be subdivided into several partial width areas or sections that are selectively turned on and off, and the motor and the control valves can be controlled as a function of the operating condition of the sections. The rotational speed of the motor is adjusted according to the spray width and is increased when a section is switched on and decreased when one or more sections are shut off. Therefore the flow rate in the sprayer line can be reduced or increased corresponding to the partial areas taken out of operation or partial areas put into operation.

The process provides that the sprayer line be connected with a further return line through which the sprayer line is connected to the tank in such a way that a return of the sprayer fluid conducted through the sprayer line can be returned to the tank. The flow of sprayer fluid through the additional return line can be controlled by the additional control valve, and the motor and the control valves can be controlled as a function of the flow in the additional return line. Input devices for the electronic control system are provided for selectively operating the system in several operating modes, and the motor and the control valves can be controlled as a function of an adjustable operating mode. Operating modes such as, for example, tank filling mode, flushing mode, spray mode, turn over mode, recirculation mode or non-operating mode can be selected. The various operating modes are associated with certain preset control magnitudes for rotational speed for the degrees of opening or closing of the control valves, and the electronic control system automatically provides corresponding control signals to the various controllable devices.

The process provides that the operating modes include a tank filling mode and/or a rinse mode. For operation in the tank filling mode or the rinse mode, a predetermined rotational speed for the motor can be provided. The electronic control system inputs the necessary control signals to close the return line control valve and operate the sprayer line control valve for a predetermined rinse pressure. For example, the rinse pressure can also be held below a pressure that would open the sprayer nozzle on the sprayer gear.

The above described characteristics of an agricultural field sprayer as well as the process described for an operation of a field sprayer apply equally well to a towed field sprayer and to a self propelled field sprayer. In addition other types of spray machines such as sprayers attached to a vehicle are to be considered and conform to the aforementioned characteristics and process steps.

The drawings show an embodiment of the invention on the basis of which the invention as well as advantages and further advantageous developments of the invention shall be described and explained in greater detail in the following.

DESCRIPTION OF THE PREFERRED EMBODIMENT

Figure 1:
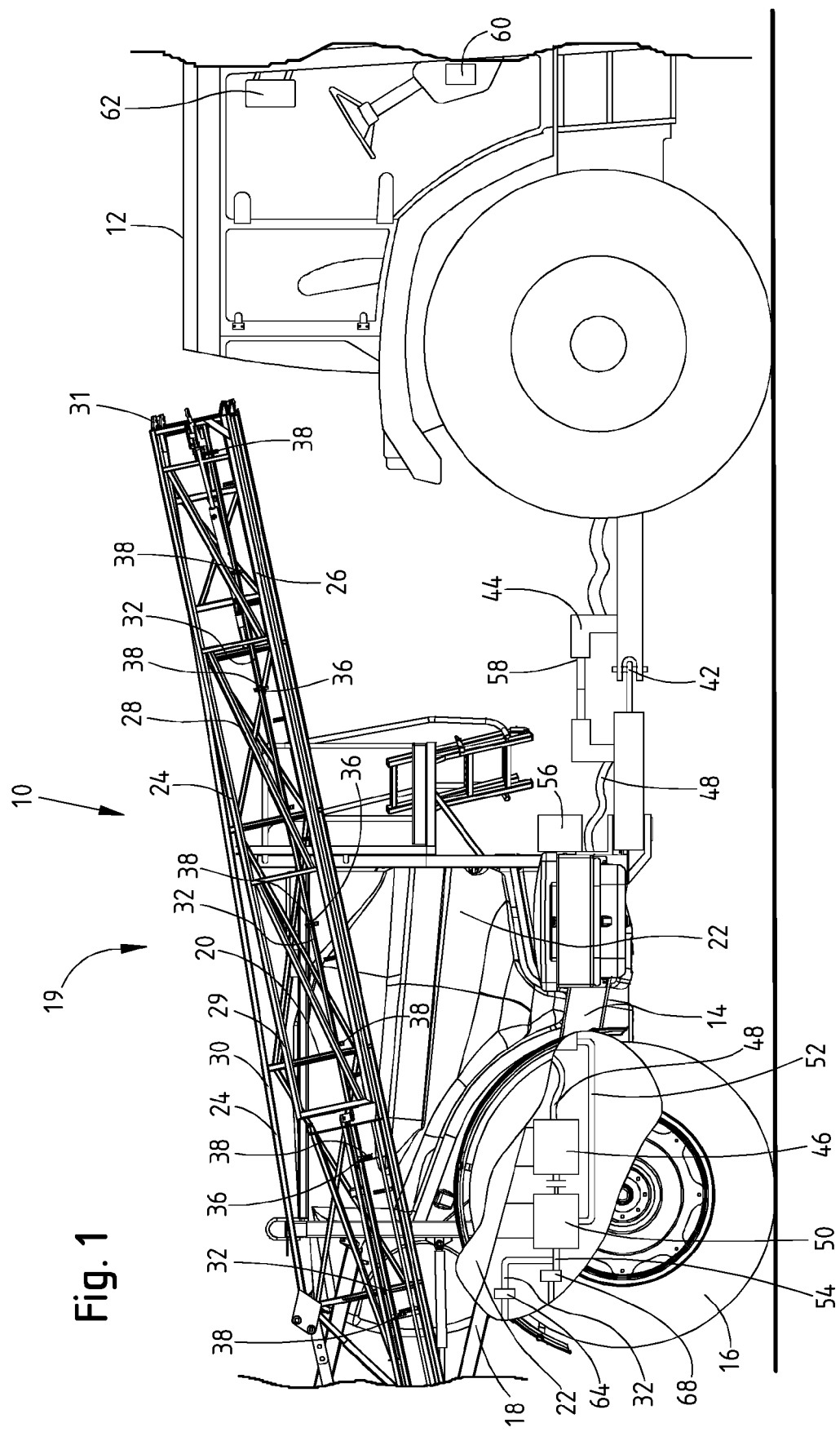
FIG. 1 shows a schematic side view of an agricultural field sprayer according to the invention.

FIG. 1 shows an agricultural field sprayer 10 which, by way of example only, is depicted as a towed field sprayer connected to a tractor 12. A self-propelled field sprayer or an attached field sprayer could also be used. The sprayer 10 includes a frame 14 with wheels 16. A parallel linkage 18 with a trailing sprayer arrangement 19 is attached to the frame 14. The sprayer arrangement 19 includes sprayer gear or a spray boom assembly 20. A tank 22 mounted on the frame 14.

The sprayer gear 20 includes upper and lower carriers or tubes 24, 26, connected by a plurality of struts 28 that form a framework. The sprayer gear 20 is composed of several partial areas 29, 29', 30, 30' that are connected to each other by hinges 31 and that extend on either side of the sprayer 10. The sprayer gear 20 can be folded into a transport position by means of the hinges 31 as shown in FIG. 1 or unfolded to a conventional operating position.

Figure 2:
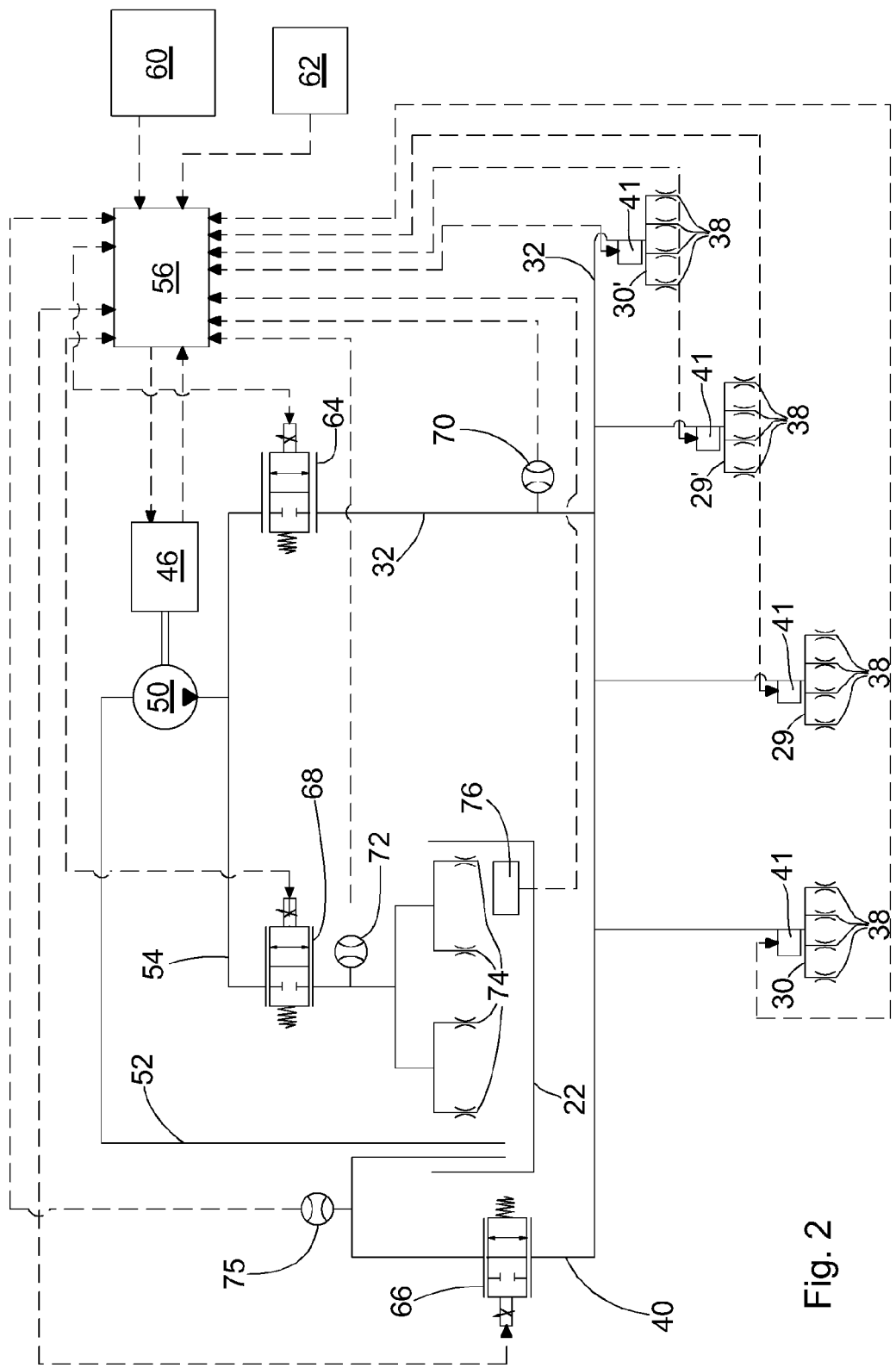
FIG. 2 shows a schematic hydraulic circuit diagram of the agricultural field sprayer shown in FIG. 1.

The sprayer gear 20 is equipped with a sprayer line 32 that extends on both sides of the sprayer 10 along the sprayer gear 20. The sprayer line 32 is at least partially configured as a pipe that is provided with outlet openings 36 to which sprayer nozzles 38 are fastened. The sprayer line 32 is connected with a return line 40 (see FIG. 2) that circulates unsprayed fluid from the sprayer line 32 to the tank 22.

The partial areas 29, 29', 30, 30' of the sprayer gear 20 can be connected or disconnected by partial area or section cut-off valves 41 configured as closing valves. The valves 41 are located in the sprayer line 32 upstream or ahead of the sprayer nozzles 38 so that the entire area of the sprayer gear 20 or only individual areas, so called partial areas 29, 29', 30, 30' of the sprayer gear 20, can be selectively turned on and off.

The sprayer 10 is connected to the tractor 12 by an attachment coupling 42. The tractor 12 is provided with a current supply interface 44, preferably for an alternating current supply, connected to an electric motor 46, such as an alternating current motor, via supply cable 48. The motor 46 is drivingly connected to a pump 50. The pump 50 is configured as a piston-membrane pump or as a different type of membrane pump, a simple piston pump or a centrifugal pump.

The pump 50 is connected to the tank 22 by a supply line 52 which acts as a pump inlet line or a suction line. The output side of the pump 50 is connected to a return line 54 and to the sprayer line 32. The return line 54 extends from the pump 50 back into the tank 22 and permits a recirculation of the sprayer fluid from the pump 50. The sprayer fluid contained in the tank 22 can circulate through the pump 50 and the return line 54 to provide recirculation.

An electronic control system 56 generates control magnitudes for the motor 46. The control system 56 is preferably positioned at the agricultural field sprayer 10 but could also be positioned on the tractor 12. The electronic control system 56 is connected with the tractor 12 over a corresponding interface 58 such as, for example, a CAN BUS system. An on-board computer or a vehicle control 60 installed is installed on the tractor. An exchange of vehicle data such as drive engine rotational speed, vehicle speed, transmission ratio of transmission gear box or gear box ratios, or of the drive line, as well as acceleration data and the like are possible for purposes of control between vehicle control and the electronic control system of the sprayer 10.

An input module 62 on the tractor 12 is used as an input device which can be used by an operator to provide control data as input for the sprayer 10. Also, other stored data can be recalled and used for control purposes by the electronic control system 56.

The sprayer line 32, the return line 40 and the return line 54 are each provided with an electrically controllable control valve 64, 66, 68. The controllable valves 64, 66, 68 are also connected to and controlled by the electronic control system 56. The control valves 64, 66, 68 are configured as electrically controlled or adjustable throttle valves or proportional path valves or proportional control valves. A sensor 70, which may be a pressure sensor, a flow sensor or a volume flow sensor is located downstream of the control valve 64 in the sprayer line 32. The sensor 70 is located in the vicinity of the control valve 64 but upstream of the partial area valve 41.

An additional pressure or flow sensor 72 is located downstream of the control valve 68 in the return line 54 close to the control valve 68. The return line 54 terminates downstream of the flow sensor 72 within the tank 22. In the tank 22, the return line 54 is connected to corresponding outlet nozzles 74 from which the returned sprayer fluid or the recirculated sprayer fluid exits into the tank 22.

A further pressure sensor or flow sensor 75 may be provided downstream of the control valve 66 in the return line 40. The sensor 75 can be utilized for the calculation and control of the degree of recirculation of the sprayed material.

A degree of fill or tank level sensor 76 is located in the tank 22 and is connected to the electronic control system 56. Tank level and fill signals are delivered by the sensor 76 to the control system 56.

The vehicle control 60 as well as the control valves 64, 66, 68, the partial area valves 41, the motor 46, the pressure sensors or flow sensors 70, 72, 75, the degree of fill sensor 76 and the input module 62 are connected to the electronic control system 56 by electric control lines (shown in FIG. 2 in dashed lines) of the sprayer 10. As shown, the input module 62 operates sprayer operator input device so that the control signals for the individual components, such as control valves 64, 66, 68, partial area valves 41, and the motor 46 that drives the pump 50, can be supplied with control data and provided with input regarding the sprayer material used or recalled from the memory of the module 62, from the electronic control system 56 or from a data storage bank stored therein. Stored input from, for example, a read only memory can be recalled along with information related to the sprayer material selected by the operator with rate of recirculation inputs, mixing ratios information, and sedimentation tendency or the like regarding the sprayer material. The recalled information is processed by the electronic control system 56 for purposes of control. Also, the desired rate of application of sprayer fluid can be input to the electronic control system 56. The required flow rate as a function of the vehicle speed is calculated to determine the required flow rate, the required supply rate of the pump 50 and/or the required rotational speed of the motor 46 and to determine the degree of opening of the control valves 64, 66, 68. Corresponding control signals are generated by the electronic control system 56 as a function of the vehicle speed (speed signals can be retrieved continuously at the vehicle control 60) as well as a function of other control magnitudes such as flow rate in the sprayer line 32, flow rate in the return line 54, flow rate in the return line 40, degree of fill of the tank 22, the operating condition of the partial areas 29, 29', 30, 30', and corresponding control signals for the motor and for the control valves 64, 66, 68 or for the partial area valves. Moreover, several operating modes can be selected using the input module 62. The operating modes can include, for example, tank filling mode, rinse mode or cleaning mode, or turn-over mode or recirculation mode (for example, for operation on public roads). Non-operating modes can be selected wherein certain corresponding control functions are automatically recalled by the electronic control system 62 and are converted into corresponding control signals for rotational speed of the motor 46 and opening and closing rate of the control valves 64, 66, 68 or the partial area valves 41.

The electronic control system 56 is configured in such a way that when the pump 50 is operating with the agricultural field sprayer 10 stopped (the vehicle speed is zero), the control valve 68 in the return line 54 is opened and the control valve 64 provided in the sprayer line 32 is closed. The electric motor 46 for the pump 50 and the control valves 64, 68, particularly the control valve 68 provided in the return line 54, can be controlled as a function of the type of the sprayer fluid or the sprayed material and/or the degree of fill of the tank 22 and/or a variable time interval that can be provided as input. The electronic control system 56 considers electronic control signals that are generated, for example, by input devices for the aforementioned input module 62. The operator can provide input as to the type of sprayer material used or a time interval, whereupon corresponding control signals can be generated in connection with data stored in the input devices 62 or in the electronic control system 56. The pump 50 and the control valves 64, 66, 68 can be operated or controlled as a function of the vehicle speed and whether or not the agricultural sprayer is moving, and as a function of other factors such as the type of sprayer material, fill status of the tank with sprayer fluid and time inputs or time interval inputs. In that way in particular the recirculation process can be made to conform optimally to the sprayer material.

Upon an acceleration of the agricultural field sprayer 10, the control valve 64 in the sprayer line 32 is opened as a function of the acceleration and the motor 46 is operated with increasing or decreasing motor rotational speed with increasing or decreasing vehicle speed. Therefore the application rates of sprayer material provided as input can be maintained exactly. The control valve 64 in the sprayer line 32 is increasingly opened and motor rotational speed and correspondingly the pump output is increased to attain a higher flow rate in the sprayer line 32. With decreasing velocity of the agricultural field sprayer 10, the control valve 64 in the sprayer line 32 is increasingly closed and the motor rotational speed and pump power output is reduced in order to reduce the flow rate in the sprayer line 32. When the control valve 64 in the sprayer line 32 already is fully opened and the vehicle speed increases further, the flow rate can be increased further by a corresponding increase in the pump motor rotational speed.

When the control valve 64 in the sprayer line 32 is fully open, the control valve 68 in the return line 54 can be opened or closed as a function of the motor rotational speed. Therefore, with further increasing or decreasing flow rate in the sprayer line 32 the recirculation rate of the sprayer fluid in the tank 22 can be controlled independently thereof, to selectively maintain recirculation rate constant or to reduce or increase recirculation rate.

The system can increase the rotational speed of the motor when one or more partial area sections 29, 29', 30, 30' are switched on or reduce motor rotational speed when a section is turned off. Therefore the flow rate in the sprayer line 32 can be decreased or increased corresponding to whether one or more partial areas 29, 29', 30, 30' of the sprayer gear 20 are taken out of operation or put into operation.

The sprayer line 32 is connected to the tank 22 by the return or recirculation line 40 to control, if necessary, the return of fluid to the tank by the control valve 66 as a function of the a control signal from the flow sensor 75. The motor 46 and the other control valves 64, 68 moreover can be controlled as a function of the flow in the return line 40. Therefore, any of the operating modes, such as, for example, tank fill mode, rinse mode, sprayer mode, turn-over mode, recirculation mode or non-operating mode can be selected. The various operating modes associated with certain preselected control magnitudes such as rotational speed or degree of opening or closing for the control valve are converted automatically into corresponding control signals by the electronic control system 56.

When the tank fill or rinse mode is selected, a preselected rotational speed can be provided as an input by the electronic control system 56. The return line control valve 68 is closed and the control valve in the sprayer line 32 or the valves in the sprayer gear 20 can be controlled so that, for example, the rinse pressure can also be held below a pressure that would open the spray nozzles on the sprayer gear.

Although the invention has been described in terms of only one embodiment, anyone skilled in the art will see many varied alternatives, modifications and variations in the light of the above description as well as the drawings, all of which fall under the above invention and can be made without departing from the scope of the invention as defined in the accompanying claims.

We claim:

1. An agricultural field sprayer adapted for forward movement at a vehicle speed over a field, the field sprayer comprising:
a sprayer fluid tank supplying a sprayer fluid;
sprayer gear for the application of the sprayer fluid;
a pump for conveying the sprayer fluid at a sprayer fluid application rate;
a supply line connecting the tank with the pump;
a return line connecting the pump with the tank;
a sprayer line connecting the pump with the sprayer gear;
an electric motor drivingly connected to the pump;
a first control valve connected to the return line for controlling return of fluid to the tank;
a second control valve connected to the sprayer line for controlling flow of sprayer fluid to the sprayer gear;
a plurality of section control valves connected to the sprayer line and having selective operating conditions; and
an electronic control system connected to the motor, to the first and second control valves, and to the plurality of section control valves and responsive to the vehicle speed and the selective operating conditions of the section control valves for controlling the motor and the first and second control valves as a function of the vehicle speed of the field sprayer and the selective operating conditions of the section control valves; wherein the sprayer fluid application rate while the sprayer fluid is being applied is dependent on both the speed of the motor and the control of at least one of the first and second control valves.

2. The agricultural field sprayer according to claim 1, further comprising a spray line sensor providing a spray line signal indicative of a sprayer fluid condition in the sprayer line, wherein the electronic control system is responsive to the spray line signal to control the first and second control valves.

3. The agricultural field sprayer according to claim 1, further comprising a return line sensor providing a return line signal indicative of a sprayer fluid condition in the return line, wherein the electronic control system is responsive to the return line signal to control the first and second control valves.

4. The agricultural field sprayer according to claim 1, further comprising an additional return line connecting the sprayer line with the tank and including a third control valve, wherein the third control valve, the first control valve, and the motor are controllable as a function of a characteristic of the sprayer fluid in the second additional return line.

5. The agricultural field sprayer according to claim 4, wherein the electronic control system includes an input device selectively providing a plurality of adjustable operating modes, the first, second, and third control valves and motor are controllable as a function of the selected operating mode.

6. The agricultural field sprayer according to claim 1, wherein at least one of the first and second control valves comprises one of the following: an adjustable throttle valve and a proportional valve.

7. The agricultural field sprayer according to claim 1, wherein the pump is located directly under the tank.

8. The agricultural field sprayer according to claim 1, further comprising an additional return line connected between the sprayer line and the tank, a third control valve connected to the additional return line for controlling fluid flow through the additional return line, wherein the first control valve, the second control valve and the third control valve are operable to provide an adjustable recirculation mode wherein the second control valve regulates recirculation rate independently of changes in flow rate in the sprayer line.

9. A method of operating an agricultural field sprayer with a sprayer fluid tank, sprayer gear for the application of a sprayer fluid, a pump for the conveying of the sprayer fluid, a supply line connecting the tank with the pump, a return line connecting the tank with the pump and a sprayer line connecting the pump with the sprayer gear, the method comprising the steps of:
driving the pump with an electric motor;
providing an electrically controlled first control valve connected to the return line;
providing an electrically controlled second control valve connected to the sprayer line;
providing a plurality of section control valves connected to the sprayer line to control sprayer output from the sprayer gear;
connecting the first and second control valves, the plurality of section control valves, and the electric motor to an electronic controller; and
controlling flow of sprayer fluid to the sprayer gear and through the return line with the electronic controller by varying the speed of the electric motor,
operating at least one of the first and second control valves, and turning one or more of the section control valves on or off to change area being sprayed, and varying speed of the electric motor in response to the turning on or off of the section control valves;

wherein the step of controlling flow includes controlling the flow of sprayer fluid to the sprayer gear in dependence on speed of the field sprayer.

10. The method of claim 9, wherein the step of controlling the flow of sprayer fluid to the sprayer gear includes the step of opening the first control valve and closing the second control valve when the speed of the field sprayer is zero, and further including the step of controlling the electric motor and the first and second control valves as a function of one or more of the following:

a. type of sprayer fluid;

b. amount of filling of the tank;

c. an adjustable time interval; and d. a selected level of recirculation from the sprayer line to the tank.

11. The method of claim 9, further comprising the steps of detecting acceleration of the field sprayer, and operating at least one of the first and second control valves as a function of the detected acceleration.

12. The method of claim 11, further comprising the step of driving the electric motor at a rotational speed dependent on the detected acceleration.

13. The method of claim 11, wherein the step of operating at least one of the first and second control valves includes fully opening the second control valve, and opening and closing the first control valve as a function of rotational speed of the electric motor.

14. The method of claim 9, further comprising the step of providing an additional return line having a third control valve therein; connecting the additional return line between the sprayer line and the tank; and operating the third control valve in the additional return line in dependence on a selected operating mode of the field sprayer.

15. The method of claim 14, further comprising the step of controlling the first and second control valves and the electric motor in dependence on the selected operating mode.

16. The method of claim 15, wherein the step of controlling the first and second control valves and the electric motor in dependence on the selected operating mode includes controlling the first and second control valves and motor in dependence on selection of at least one of the following modes using the electronic controller:

a. a tank fill mode;

b. a rinse mode; and c. a recirculation mode.

17. The method of claim 9, further comprising the step of controlling the first and second control valves in response to the turning on or off of the section control valves.

18. The method of claim 9, further comprising the steps of selecting one of the following modes of operation of the sprayer:

a. a tank fill mode;

b. a rinse mode; and c. a recirculation mode;

selecting a motor rotational speed dependent upon the operating mode selected using the electronic controller; and controlling the first control valve and the second control valve to control the pressure in the sprayer line and prevent application of the sprayer fluid from the sprayer gear when one of the above modes a., b., or c, is selected.

* * * * *